United States Patent
Toscano

(10) Patent No.: US 10,486,475 B2
(45) Date of Patent: Nov. 26, 2019

(54) TYRE AND METHOD FOR MAKING A TYRE

(71) Applicant: BRIDGESTONE CORPORATION, Tokyo (JP)

(72) Inventor: Marco Toscano, Rome (IT)

(73) Assignee: BRIDGESTONE CORPORATION, Tokyo (JP)

(*) Notice: Subject to any disclaimer, the term of this patent is extended or adjusted under 35 U.S.C. 154(b) by 315 days.

(21) Appl. No.: 15/309,549

(22) PCT Filed: May 5, 2015

(86) PCT No.: PCT/EP2015/059815
§ 371 (c)(1),
(2) Date: Nov. 8, 2016

(87) PCT Pub. No.: WO2015/173068
PCT Pub. Date: Nov. 19, 2015

(65) Prior Publication Data
US 2017/0136831 A1  May 18, 2017

(30) Foreign Application Priority Data

May 13, 2014 (IT) .............. RM2014A0239

(51) Int. Cl.
*B60C 15/06* (2006.01)
*B29D 30/48* (2006.01)

(52) U.S. Cl.
CPC .............. *B60C 15/06* (2013.01); *B29D 30/48* (2013.01); *B29D 2030/486* (2013.01); *B60C 2015/0625* (2013.01)

(58) Field of Classification Search
CPC .......................................................................
B60C 15/06; B60C 15/0607; B60C 15/0628; B60C 15/0632;
(Continued)

(56) References Cited

U.S. PATENT DOCUMENTS 4,387,759 A   6/1983  Obata et al.
4,842,033 A   6/1989  Nguyen
(Continued)

FOREIGN PATENT DOCUMENTS

DE  10 2010 016007 A1   9/2011
EP   0 393 966 A1      10/1990
(Continued)

OTHER PUBLICATIONS

Toru Tsuda, JP-61222801, machine translation. (Year: 1986).*

(Continued)

*Primary Examiner* — Robert C Dye
*Assistant Examiner* — Sedef E Paquette
(74) *Attorney, Agent, or Firm* — Sughrue Mion, PLLC

(57) ABSTRACT

A tyre including two toroidal bead portions housing an annular bead bundle (121); a toroidal body ply, folded, about a respective bead bundle forming a respective turn-up; two bead fillers, each in contact with a respective bead bundle and at least partly enclosed by a respective turn-up, and two elastomeric crack control members, one for each bead portion. Each crack control member extends at a body ply ending, and each crack control member is made by a couple of strips having a differentiated stiffness along their transversal section, with a lower stiffness at a first strip adjacent to the body ply ending and a higher stiffness at a second strip in contact with the respective bundle, so that the first lower stiffness strip defines a preferential propagation path for any tyre crack originating at the body ply folded ending.

9 Claims, 6 Drawing Sheets

(58) Field of Classification Search
CPC .... B60C 2015/0617; B60C 2015/0625; B60C 2001/005; B60C 2001/0058; B60C 2015/0642; B29D 30/48; B29D 30/50; B29D 2030/481; B29D 2030/482; B29D 2030/486
USPC .................................................. 152/542, 546
See application file for complete search history.

(56) References Cited

U.S. PATENT DOCUMENTS

| | | | | |
|---|---|---|---|---|
| 4,941,523 | A * | 7/1990 | Galante ................. | B60C 5/14 152/510 |
| 2007/0175561 | A1* | 8/2007 | Daghini ................ | B60C 15/06 152/542 |
| 2010/0108220 | A1* | 5/2010 | Mruk .................... | B60C 15/06 152/458 |
| 2010/0224300 | A1 | 9/2010 | Maruoka | |

FOREIGN PATENT DOCUMENTS

| | | | | |
|---|---|---|---|---|
| JP | 61222801 A | * | 10/1986 | ............... B60C 3/04 |
| WO | WO-2012098500 A1 | * | 7/2012 | ............. B29D 30/32 |

OTHER PUBLICATIONS

Hertz et al. (Shore a Durometer and Engineering Properties, The New York Rubber Group, 1998, pp. 3, 6). (Year: 1998).*
International Search Report for PCT/EP2015/059815 dated Aug. 13, 2015 [PCT/ISA/210].
Written Opinion for PCT/EP2015/059815 dated Aug. 13, 2015 [PCT/ISA/237].

* cited by examiner

TYRE AND METHOD FOR MAKING A TYRE

CROSS REFERENCE TO RELATED APPLICATIONS

This application is a National Stage of International Application No. PCT/EP2015/059815 filed May 5, 2015, claiming priority based on Italian Patent Application No. RM2014A000239 filed May 13, 2014, the contents of all of which are incorporated herein by reference in their entirety.

TECHNICAL FIELD OF THE INVENTION

The present invention relates to a tyre, in particular a so-called low turn-up tyre, and to a method for making said tyre.

BACKGROUND

Tyres known in the art have a multilayer structure, some components of which are schematically exemplified in FIG. 1. The latter shows a transverse section of the tyre, in particular a radial section taken along a plane passing through—or parallel to—the rotation axis.

With reference to FIG. 1, the most external part of the tyre comprises a toroidal tread 500 and two side walls 501 e 502, the latter arranged, in use, in a position proximal and distal to the vehicle, respectively. Bilaterally to tread 500, between it and each side wall 501, 502, transition zones (shoulders) 511 and 512 are provided.

Still in the most external part of the vehicle, in the portion close to/in contact with the rim (herein denoted by C) the tyre has abrasion gum strips 503 and 504.

The part of the tyre facing onto, and in contact with, the inner tube is the so-called inner liner 515.

The tyre main body, without tread, is generally referred to as casing or body 505.

Inside the tyre, between tread and casing, a toroidal body ply 510 is provided. Typically, a tread belt 509 separates said body ply from tread.

Each one of the two toroidal tyre portions intended to engage the rim is called bead and denoted by 506 and 507, respectively, in FIG. 1. The most external part of each bead is made of one of said abrasion gum strips 503 and 504. Inside each bead, a bundle of metallic wires (bead bundle) is provided, tipically enclosed into an elastomer casing. Said bundle, in FIG. 1, is denoted, by way of example, by 511 for bead 506. What will be said hereinafter for the latter is to be considered valid also for other bead 507.

Bead bundle 511 is associated with a bead filler 512. Such filler is typically made of an elastomer of great hardness, capable of increasing the stiffness of the tyre sides. At each bead, body ply 510 envelops the bead bundle 511 and its respective bead filler 512, so as to form a turn-up 514.

During tyre construction, each filler, which has substantially the shape of a triangular body, is coupled with the corresponding bead bundle. The two filler-bundle assemblies are laid onto the body ply, which is lying about a construction drum before the turning (folding) operation that generates the turn-ups.

Each bead filler serves the primary function of ensuring a continuous variation of the elastic return from the materials constituting the bead—which are relatively more rigid—to the respective sidewall of the tyre, relatively more elastic. However, the presence of the filler as described above induces an increase in mass and volume of the bead, and therefore in the whole tyre, that may decrease rolling efficiency.

To overcome the just mentioned disadvantage, WO 2012/098500, to the same applicant, discloses a tyre wherein each bead filler is obtained from an elastomer strip interposed between the bead bundle and the body ply. Such elastomer strip, in the body ply turn-up operation, is folded as a "U", so as to form a ring around the bead bundle. The tyre is then cured, so that there is no need for a pre-assembly of the fillers with the respective bead bundles.

In any case, the known configurations can be optimized in terms of balance between the overall stiffness of the tyre bead, the tyre mechanical durability and the desired reduction of mass and volume.

Another critical aspect in the tyres of the known art is represented by the formation of cracks at the body ply transverse ending folded towards the tyre external part (body ply ending), sometimes indicated as point "P1" (in cross section) and so identified in FIG. 1. Such cracks generation is made easier by the friction which may arise between the body ply flaps which contact at the turn-up, and/or by the presence of an interface between materials with different mechanical characteristics, in the specific case the body ply material and the elastomeric material which constitutes the tyre outer part. The generation and subsequent rapid propagation of a crack through the respective abrasion strip limits tyre lifetime.

The disadvantage just mentioned is particularly marked in the case of so-called "low turn-up" tyres, that is, with a turn-up of limited height.

In the attempt to solve such disadvantage, the application of local reinforcements, eventually multilayer ones, has been proposed, which reinforcements are arranged at each body ply side end (i.e. on body ply endings). However, often such configurations cause a significant increase in complexity of the tyre construction method. Furthermore, none of the known solutions results in an increase of durability of such a magnitude as to compensate for the above-mentioned increase in constructive complexity.

EP 0 393 966 discloses a radial tyre having a hard rubber sheet disposed at the outer side of each turn-up portion and a soft rubber material interposed between the turn-up portion and the hard rubber sheet.

U.S. Pat. No. 4,842,033 discloses a tyre having, at the bead portions, gum strips encapsulating the cut edge of a cord reinforcement ply.

SUMMARY OF THE INVENTION

The technical problem posed and solved by the present invention is therefore to provide a tyre and a method for making a tyre which allow overcoming the disadvantages mentioned above with reference to the known art.

This problem is solved mainly by a tyre according to claim 1 and by a method according to claim 10.

Preferred features of the present invention are object of the dependent claims.

The invention allows increasing tyre mechanical durability by providing a reduced stiffness (high deformability) preferential path for the propagation of any crack originating at the folded body ply ending.

For this purpose, according to a particularly preferred embodiment, each bead filler is obtained from a couple of elastomeric material strips which are folded towards the outside of the tyre at the transverse end ("P1") of the body ply portion making the turn-up (i.e. at the body ply ending).

In particular, a first low stiffness (soft) strip is arranged adjacent to, and in contact with, the body ply and a second high stiffness (hard) strip is arranged onto the first strip, in contact with the respective bead bundle. Preferably, the second strip stiffness is higher than that of the respective abrasion gum strip of the tyre.

In the preferred embodiment just mentioned, the filler of each bead is thus made by said two strips, which wound about the bead bundle as a "U", and which also have an appropriate length as to fold beyond the transverse end of the body ply turn-up. In this way, the two strips protect the body ply endings both internally and externally to the turn-up.

Preferably, said two strips are made fixed as a consequence of vulcanizing the tyre and/or its beads, performed downstream of said steps of body ply turning up and of overturning the strips outside to the respective turn-up. In other words, the two strips do not require a prior coupling and can be simply laid one onto the other, and onto the body ply, during tyre construction, before the turning-up operation.

Therefore, said strips provide, for each bead, a differentiated stiffness along tyre transverse section, in particular a lower stiffness at the part adjacent to the body ply. In this way, at the interface between the two strips, a stiffness (deformability) gradient is created. Such gradient induces the crack to propagate along the turn-up outer side, according to a direction substantially parallel to the latter rather than, as in the known systems, according to a direction orthogonal or substantially orthogonal to the body ply portion making the turn-up. Therefore, the crack path length before it reaches the tyre outer surface is increased and, consequently, tyre durability is increased.

Moreover, the above configuration with differentiated stiffness allows using a (second) strip adjacent to the bead bundle of very high stiffness, to the advantage of the overall body ply stiffness. This also allows reducing abrasion gum strips thickness, with a consequent weight and cost reduction.

Such configuration also allows, by an appropriate selection of strips materials, modulating the gradient of stiffness (deformability) at the interface between the strips, so as to adapt such gradient to specific tyre performance requirements.

The above differentiated stiffness is obtained at least over the transverse end of the body ply which makes the turn-up (body ply ending) and at the bead portion externally adjacent to such end. In particular, according to a preferred variant, the strip of low stiffness material (adjacent to the body ply) extends, in particular as a cap, only over the region corresponding to body ply ending. Advantageously, in this configuration the thickness of the stiffer strip can be increased, resulting in a corresponding increase in stiffness of the bead region, volume and weight being equal.

In such configuration, both the first and the second strip are still part of the respective bead filler.

In more general terms, the above differentiated stiffness can be obtained with a strip having a composite structure, and in particular made by two different elastomeric materials.

According to a further variant, the differentiated stiffness is provided by a material insert having the above described characteristics and applied only at the external part of the turned up body ply portion. Such insert, therefore, is not necessarily part of the respective bead filler.

In the present context, unless otherwise specified, the term cross-section means a tyre section taken along a radial plane containing (or parallel to) the rotation axis.

The invention is particularly advantageous in case of radial tyres for passenger cars (Passenger Car Radial Tyres) and/or so-called "low turn up" tyres.

Other advantages, features and modes of employ of the present invention will become evident from the following detailed description of some embodiments, presented by way of example and not of limitation.

BRIEF DESCRIPTION OF THE DRAWINGS

Reference will be made to the figures of the enclosed drawings, wherein.

The thicknesses and curvatures shown in the figures introduced above are to be understood as purely exemplary and are not necessarily shown in proportion. Moreover, as said, in said figures some layers/components of the tyre and of its construction apparatus may have been omitted, for a clearer illustration of aspects of the present invention.

DETAILED DESCRIPTION OF PREFERRED EMBODIMENTS

Hereinafter several embodiments and variations of the invention will be described, with reference to the figures introduced above.

Analogous components in different figures are denoted by the same reference number.

In the detailed description that follows, further embodiments and variants with respect to embodiments and variants already treated in the description will be illustrated only in conjunction with the differences with respect to what has already been exposed.

Moreover, the different embodiments and variants described in the following are possibly employed in combination, when they are compatible.

Figure 1:
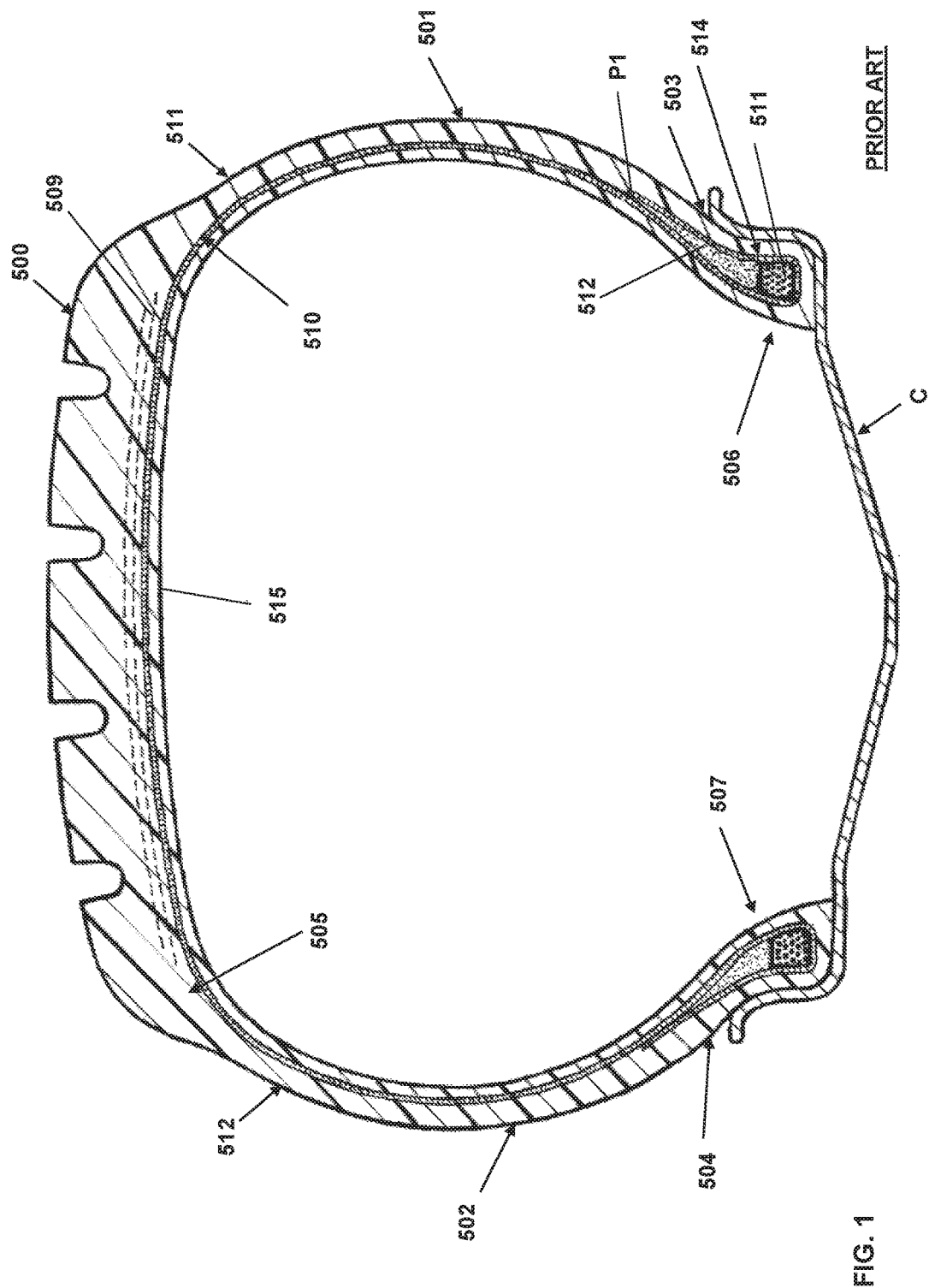
FIG. 1, already introduced above with reference to the state of the art, shows a schematic cross-sectional view of a known tyre, only some parts of which have been exemplified.
Figure 2:
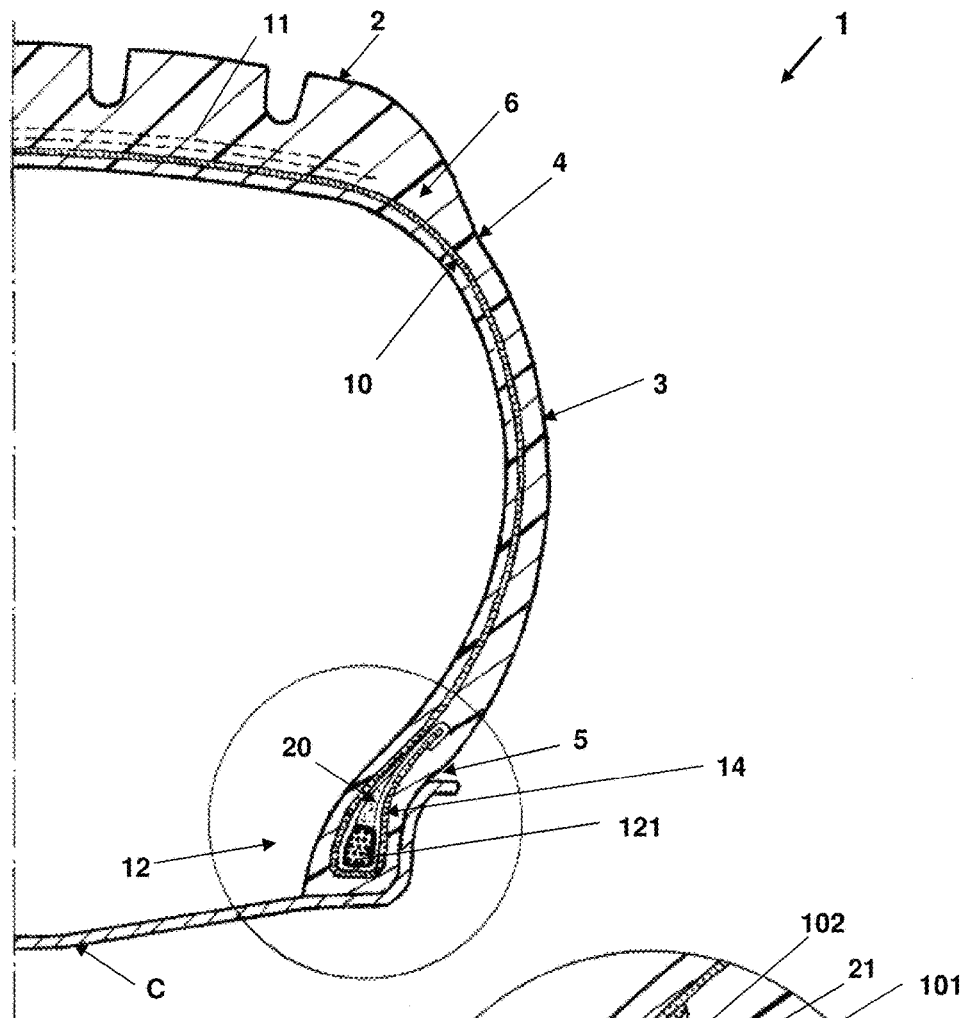
FIG. 2 shows a schematic cross-sectional view of a first preferred embodiment of the tyre according to the present invention, of which, for greater clarity, only a half-section has been represented.
Figure 2A:
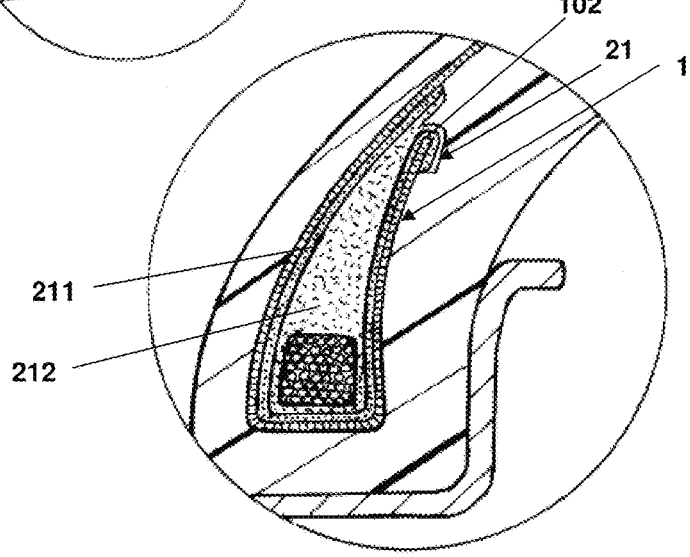
FIG. 2A shows an enlarged detail of FIG. 2, in particular relating to a portion of the tyre bead of this latter figure.

With reference initially to FIGS. 2 and 2A, a tyre according to a first preferred embodiment of the invention is generally denoted by 1. Preferably, the tyre 1 is a "low turn-up" tyre, in particular it is a RDP tyre.

Since tyre 1 is represented in half-section, in the following reference will be made to the elements and components present in the represented part. It will be understood that what is described also applies to the part contralateral to that shown.

Similarly to what already described in conjunction with the known art, tyre 1 comprises, in its outer part, a toroidal tread 2 and two side walls arranged, in use, in a position respectively distal and proximal to the vehicle. In FIG. 2 the proximal side, denoted by 3, is visible. Bilaterally to tread 2, between it and each sidewall, two respective transition areas (shoulders) are provided, one of which is shown in FIG. 2 and denoted by 4. Still at the outer part, in the portion close to/in contact with the rim—also here denoted by C—tyre 1 has Abrasion Gum Strips (AGS), one of which is shown in FIG. 2 and denoted by 5.

The tyre main body, i.e. the carcass, is denoted by 6.

Inside the tyre, between tread 2 and carcass 6, a body ply 10 having a toroidal configuration is interposed. Also in the present case, a tread belt 11 separates body ply 10 from tread 2.

Tyre 1 also comprises two toroidal portions intended to engage the rim C, i.e. two beads, one of which is visible in FIG. 2 and denoted by 12.

An annular bundle of metal cords (bead bundle), generally enclosed in a case made of elastomer, is inserted within bead 12. Such bundle, together with its casing, is denoted by 121.

A bead filler, overall denoted by 20, is associated with bead bundle 121.

At bead 12, body ply 10 is folded about the bead bundle 121 and respective filler 20, so as to form a respective turn-up 14. The end portion of the body ply part that makes turn-up 14 is denoted by 101 and its terminal end by 102 (body ply ending or point "P1" mentioned with reference to the prior art). The body ply part making turn-up 14 defines a compartment having a substantially triangular geometry. Said compartment has a base on the side of the rim and an apex on the side of tread 2. Bead bundle 121 is arranged adjacent to the base and it is in contact with filler 20 at filler portions remote from the apex.

As shown in greater detail in FIG. 2A, bead filler 20 has a portion 21 which comes out from turn-up 14 and which is turned up itself externally to body ply end portion 101. Such portion 21, for reasons that will clarified later on, is herein called a crack control element. Therefore, crack control element 21 extends externally to turn-up 14, developing adjacently to body ply end portion 101. The crack control element length is represented by way of example in the figures considered herein.

Crack control element 21 has a differentiated stiffness along its transverse section. For this purpose, it comprises a first portion 211 adjacent to body ply 10 and a second portion 212 distal (or remote) from body ply 10, which second portion 212 is therefore directed towards the outside of tyre 1 on the side of abrasion gum strip 5. First portion 211 is less stiff (softer) than second portion 212 (the latter being harder).

Crack control element 21 is typically made of elastomer. In the present example, it is made of two elastomeric materials of different stiffness, coupled during construction of tyre 1 according to modes that will be explained shortly.

Preferably, second portion 212 has a stiffness greater than that of the adjacent abrasion gum strip 5.

For example, first portion 211 may have a stiffness M50≤about 2.5 MPa, preferably M50≤about 2.2 MPa, and ELB≥about 400%, preferably of about 500%, wherein ELB indicates the Elongation at Break and M50 the stiffness modulus at 50% elongation.

Second portion 212 may have stiffness M50 comprised in a range of about 2.0-11.0 MPa and ELB may be comprised in a range of about 80%-400%, preferably M50 is comprised in a range of about 6.0-11.0 MPa and ELB is comprised in a range of about 80%-160%.

The abrasion gum strip may have stiffness M50 comprised in a range of about 1.0-2.0 MPa and ELB may be comprised in a range of about 300%-400%, preferably M50 is comprised in a range of about 1.5 to 2.0 MPa and ELB is comprised in a range of about 335-365%.

With regard to thicknesses (before a vulcanizing step), exemplary values are indicated below.

For first portion 211, the thickness is preferably comprised in a range of about 0.2-1.5 mm.

For second portion 212, the thickness is preferably comprised in a range of about 0.2-1.5 mm.

As will be illustrated in detail also in the following, first portion 211 of member 21 provides a preferential path for the propagation of any crack originating at body ply ending 102 and, in general, at body ply end portion 101.

In consequence of the described configuration, abrasion gum strip 5 may have a thickness comprised in a range of about 2.0-7.5 mm, measured at a radial distance below point P1 of about 5 mm.

Figure 4A:
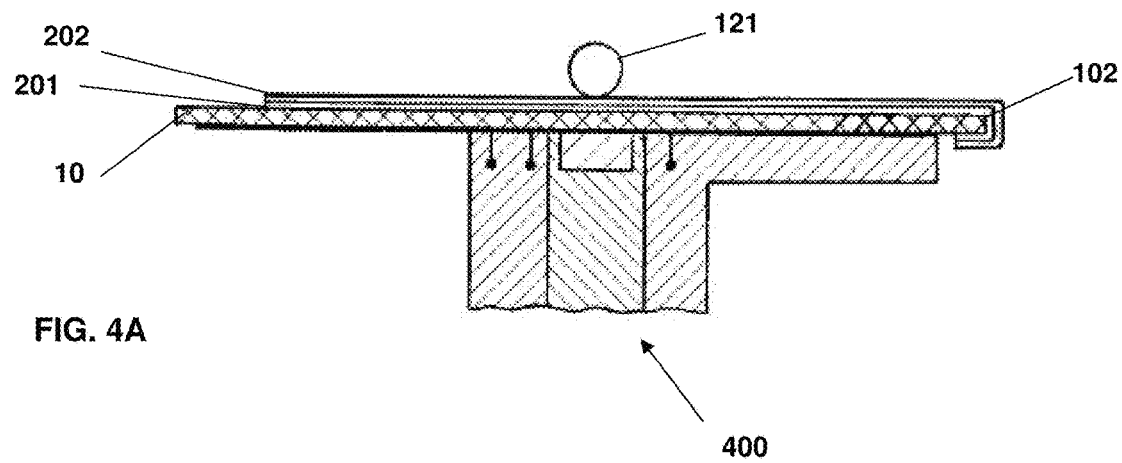
FIGS. 4A, 4B and 4C each show a schematic cross-sectional view referring to a respective construction step of the tyre shown in FIG. 2, wherein—for greater clarity—some parts of both a tyre construction apparatus and the tyre have not been represented.
Figure 4B:
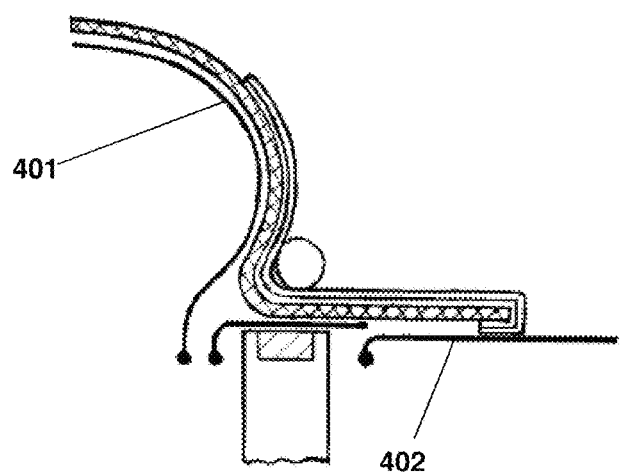
Figure 4C:
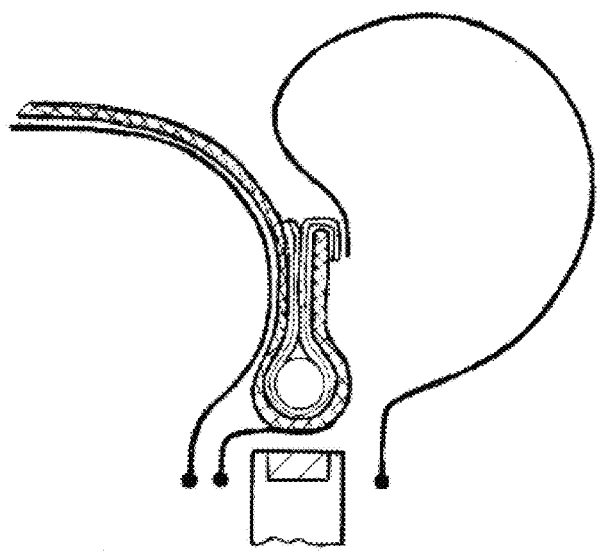

The structure of bead filler 20 and of its crack control member 21 can be better understood by referring to the construction modes of tyre 1, schematically illustrated in the sequence of FIGS. 4A to 4C. Also in this case reference will be made, for simplicity of explanation, to the construction of bead portion 12 only, it being understood that the other bead is made contextually in the same construction apparatus and according to the same operations/steps of the construction method.

Referring initially to FIG. 4A, first of all body ply 10 is laid onto a construction drum 400, represented in a very schematic way. The bead filler, in form of a pair of strips 201 and 202, is laid onto body ply 10. Strips 201 and 202 correspond to portions 211 and 212, respectively, and make such portions downstream of a final vulcanizing step of tyre 1 which will be considered shortly.

The transversal outer part of strips 201 and 202 makes crack control member 21. Such part extends beyond end 102 of body ply 10 and it is folded, or better turned up, beyond the latter—that in this step or in a subsequent step. Said filler turning up prevents the formation of air sacs generated during tyre construction.

Bead bundle 121 is then placed onto second strip 202.

Preferably, for the purpose of precise positioning, body ply 10 is arranged on drum 400, then first strip 201 is arranged onto body ply 10; similarly, after the placement of the first strip onto body ply 10, second strip 202 is laid onto first strip 201; still, bead bundle 121 is laid onto second strip 202 after having laid the latter onto first strip 201.

At this point, as shown in FIGS. 4B and 4C, drum components can be actuated, in particular two bladders 401 and 402, which fold into a "U" body ply 10 and filler about bundle 121, until the two filler branches of the "U" come into contact.

In the preferred embodiment considered herein, the configuration—and in particular the total length and positioning of the filler strips—is such that the filler results interposed between turn-up 14 and the contra-lateral flap of body ply 10 facing the tyre inside, i.e. the axially inner and "descendant" part of body ply 10. In other words, in the present configuration the two contralateral flaps of body ply 10 are not in direct contact in turn-up 14. In particular, in the described configuration the filler turn up at its crack control member 21 makes at least this filler part is always interposed between end 102 of body ply 10 and its contra-lateral side. Such interposition, single or double, of filler 20 between opposite flaps of body ply 10 facilitates, downstream of a vulcanizing step, a mutual adherence of the components, in particular preventing the detachment of the flaps of body ply 10.

As mentioned, a step of vulcanizing bead 12 follows, simultaneously to the vulcanizing of further parts of tyre 1. Such vulcanizing makes the material of original strips 201 and 202 fill completely the inner space of turn-up 14, eliminating any local air sacs. Equally, vulcanizing makes crack control member 21 adhere externally to body ply 10.

As said, each strip 201, 202 corresponds to a respective portion 211, 212 of crack control member 21, respectively of lower and higher stiffness. In the present example, therefore, the differential stiffness is provided also at the filler portion which properly performs a filling function, i.e. which is arranged within turn-up 14.

It will be understood that even though some tyre components, in particular filler 20, have been defined and denoted by the same reference number before and after the vulcanizing step, they, upstream and downstream of such step, may have different properties, for example a different configuration, conformation and thickness.

Furthermore, the above description does not mention, for reasons of brevity, the application of other elements of the tyre—such as the so-called "inner liner" and the abrasion gum strips—because such application may be accomplished by known modes.

It will be understood that said tyre vulcanizing step takes place at the end of the construction process, after all components have been assembled.

Figures 3, 3A:
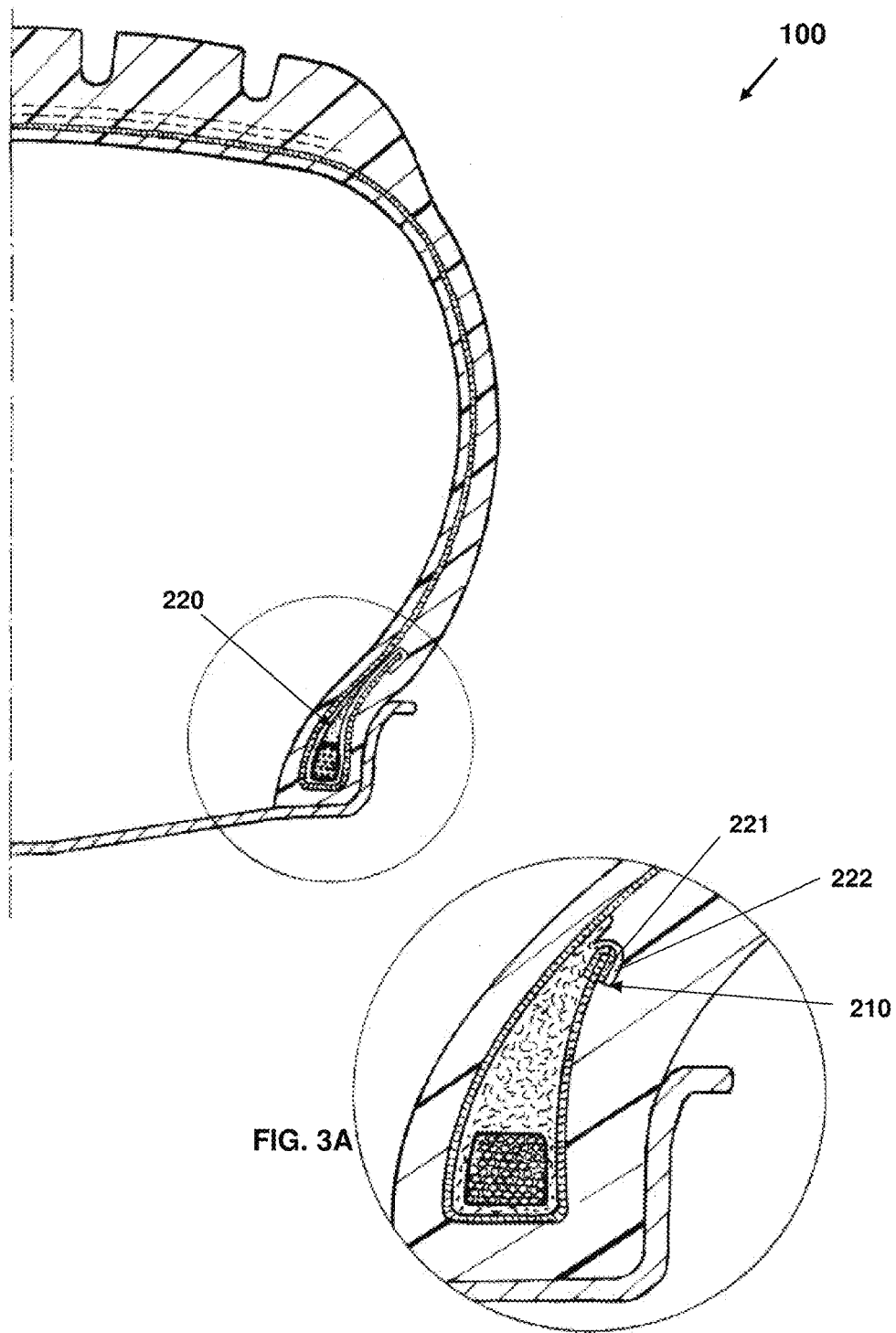
FIG. 3 shows a schematic cross-sectional view of a second preferred embodiment of the tyre according to the present invention, of which, also in this case for greater clarity, only a half-section has been represented.
FIG. 3A shows an enlarged detail of FIG. 3, relating in particular to a portion of the tyre bead of this latter figure.

FIGS. 3 and 3A show a different embodiment of a tyre according to the invention, here denoted by 100. In tyre 100, the crack control member, denoted by 210, comprises a first portion 221 of lower stiffness which extends only at body ply ending 102 of body ply 10 and from it towards the outside of the tyre. In particular, first portion 221 defines a sort of cap for ending 102 of body ply 10.

Crack control member 210 further comprises a second portion 222, similar to second portion 212 described with reference to the first embodiment. In this case, second portion 222 may have a thickness greater than the first embodiment. Preferably, in this embodiment, the thickness of the second portion 222 (before vulcanizing) is comprised in a range of about 0.5-2.5 mm.

In this second embodiment, therefore, the bead filler, denoted by 220, is made almost completely by second portion 222, first portion 221 contributing only to a small part of such filler 220 in proximity of body ply ending.

Figure 5A:
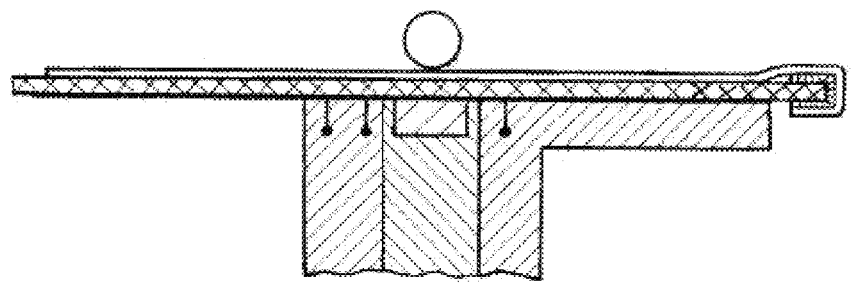
FIGS. 5A, 5B and 5C each show a schematic cross-sectional view referring to a respective construction step of the of the tyre shown in FIG. 3, wherein—also in this case for greater clarity—some parts of both a tyre construction apparatus and the tyre have not been represented.
Figure 5B:
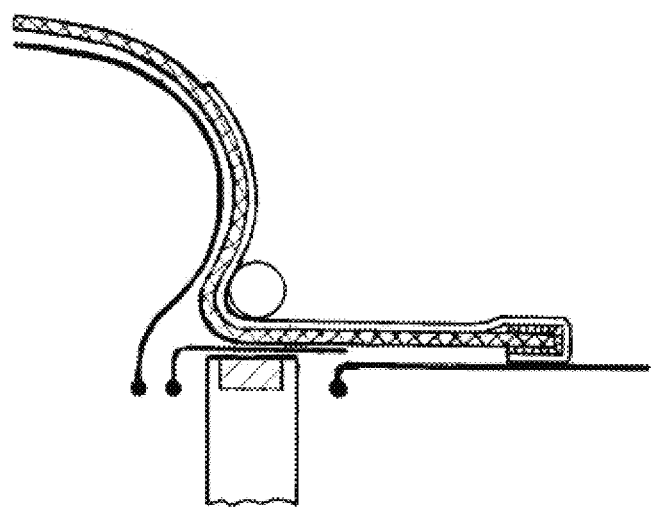
Figure 5C:
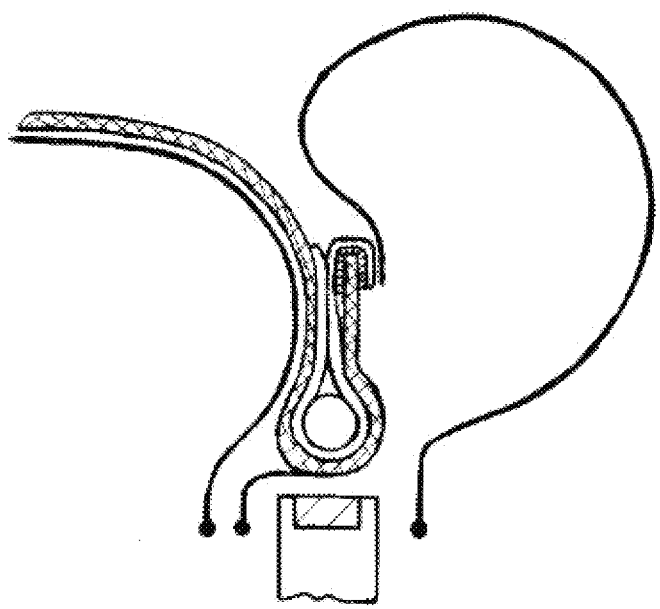

Also in this case, bead filler 220 and crack control member 210 can be made starting from a pair of strips of suitable arrangement and configuration. The modes for making a tyre are is schematically illustrated in the sequence of FIGS. 5A to 5C.

Figure 6:
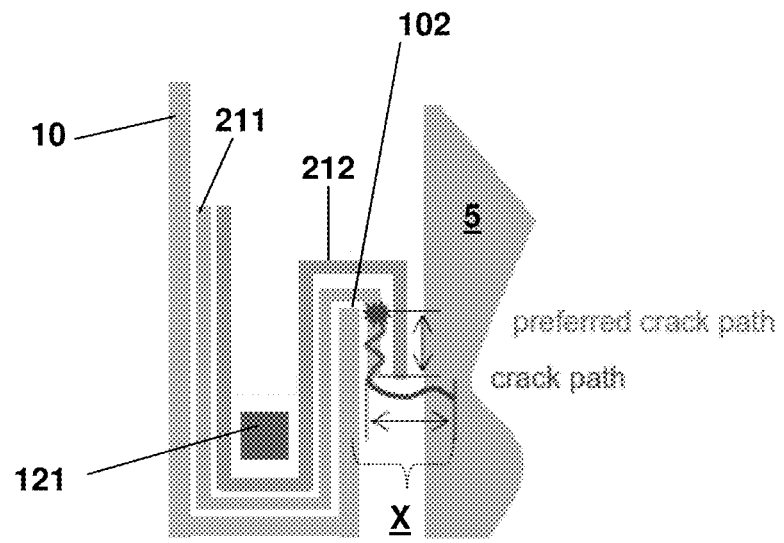
FIGS. 6 and 7 show, schematically and by way of example, the path of a crack possibly originated in the tyre according to FIG. 2 and FIG. 3, respectively.
Figure 7:
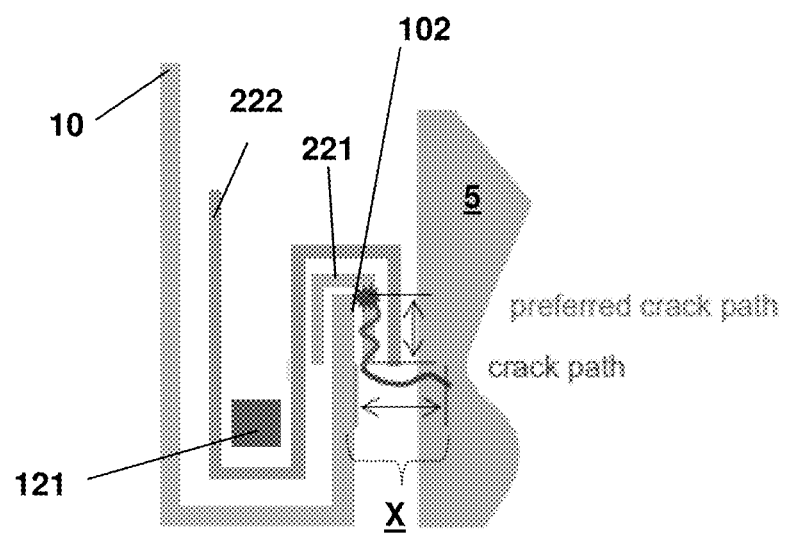

Propagation patterns of a possible crack inside tyres 1 and 100 are shown in FIGS. 6 and 7, respectively.

In particular, the crack, starting from body ply ending 102 of body ply 10, finds a stiffness (deformability) gradient at the interface between first portion 211, 221 and second portion 212, 222 of crack control member 21, 210. Consequently, on the basis of behaviors known from fracture mechanics, said crack propagates according to a preferential path, that we may define radial, within portion of lower stiffness 211, 221. After the crack has overcome the extension of crack control member 21, 221, it propagates axially towards abrasive gum strip 5, reaching the outside of tyre 1, 100.

Therefore, it will be better understood that tyre durability is greatly increased compared to a crack propagation exclusively axial.

Some simulations have been carried out upon tyre virtual models, in order to assess the deformation distribution under stress in the area denoted by X in FIGS. 6 and 7, for the two preferred embodiments considered here. Such area X corresponds to an interface region between body ply 10, crack control member 21, 210 and abrasive gum strip 5.

Such simulations have shown that deformation of body ply 10 in the concerned area is more limited compared to that of known solutions. This circumstance reduces the risk of crack generation.

Furthermore, the deformation of portion 211, 221 of lower stiffness is high, while that of the stiffer portion 212, 222 is very low, resulting in a reduced risk of direct propagation of the crack into abrasive gum strip 5.

At this point, it will be better appreciated that the invention allows obtaining the (additional) advantages described below.

First, the tyre construction method is simpler, because the strips/portions constituting the filler of each bead (and the associated crack control member) can be simply laid one onto the other upon the body ply before the turn-up operation. Therefore, it is no longer necessary to pre-couple together the bead filler and the respective bead bundle, which is a rather delicate operation required in the known tyres.

In the preferred embodiments with two strips considered above, the tyre construction is cheaper than that of solutions adopting localized reinforcements in addition to the bead filler, because of both the lowest cost of the individual elements and the simplification of the construction method, which requires no separate steps of preparation and assembly of the bead filler and the reinforcements.

Furthermore, tyre construction is more effective and efficient because the strips/portions, pre-assembled onto the body ply in the manner described above, are tightened onto the body ply during the subsequent body construction, thus eliminating any air sacs and/or risks of micro-defects.

Still in the preferred embodiments with two strips considered above, the stiffest strip compresses the less stiff strip against the body ply, further reducing the risk of manufacturing defects and the formation of air sacs.

The present invention has been up to here described with reference to preferred embodiments. It is to be intended that other embodiments are possible within the same inventive core, as defined by the scope of protection of the following claims.

The invention claimed is:
1. A tyre, comprising:
two toroidal bead portions, each of said two toroidal bead portions housing an annular bead bundle and having an external abrasion gum strip;
a toroidal body ply, which is folded, at each one of two transversal endings thereof, about a respective annular bead bundle forming a respective turn-up;
two bead fillers, one for each of said two toroidal bead portions, each of said two bead fillers being in contact with a respective bead bundle and being at least partly enclosed by a respective turn-up of said toroidal body ply, wherein the tyre further comprises two crack control members, one for each of said two toroidal bead portions, wherein each crack control member of said two crack control members extends at a body ply ending axially externally to the respective turn-up, each crack control member having a differentiated stiffness along its transversal section, with a lower stiffness at a first portion adjacent to said body ply ending and a higher stiffness at a second portion remote from said body ply ending and adjacent a respective abrasion gum strip, said first portion defines a preferential propagation path for any tyre crack originating at said body ply ending, each of said crack control members is obtained as a part of, and/or is integral to, the respective bead filler, each bead filler is made from a first, low-stiffness strip arranged in contact with said body ply and a second, high-stiffness strip having a higher stiffness than said first strip and arranged in contact with the respective bead bundle, wherein each of said first and second strip makes a respective first or second portion of said crack control member, and each of said first and second strips is wound about the bead bundle according to a "U" or annular shape internally to the respective turn-up.

2. The tyre according to claim 1, wherein one or more of the first strip or second strip of each bead filler have an outer end folded into a "U" about the respective body ply ending and out of the corresponding turn-up so as to enclose such body ply ending by forming a cap around it and making at least part of the respective crack control member.

3. The tyre according to claim 1, wherein said first strip extends only at, or at a part of, a transverse terminal end of said body ply ending.

4. The tyre according to claim 1, wherein said first portion of said crack control member has a stiffness of about $M50 \leq 2.5$ MPa and $ELB \geq 00\%$ and/or said second portion of said crack control member has a stiffness M50 comprised in a range of about 2.0-11.0 MPa and ELB comprised in a range of about 80%-400%.

5. The tyre according to claim 1, wherein, before vulcanization, said first portion of said crack control member has a thickness comprised in a range of about 0.2-1.5 mm and/or said second portion of said crack control member has a thickness comprised in a range of about 0.2-1.5 mm or 0.5-2.5 mm.

6. The tyre according to claim 1, which is a tyre configured for a passenger vehicle.

7. The tyre according to claim 1, wherein said two crack control members are made of elastomer.

8. The tyre according to claim 1, wherein each of the first strip and the second strip are elastomeric material.

9. The tyre according to claim 1, wherein both the first portion and the second portion of the each crack control member extend at the body ply ending axially externally to the respective turn-up.

* * * * *